United States Patent
Yuan et al.

(10) Patent No.: US 7,171,337 B2
(45) Date of Patent: Jan. 30, 2007

(54) EVENT-BASED AUTOMATED DIAGNOSIS OF KNOWN PROBLEMS

(75) Inventors: Chun Yuan, Beijing (CN); Ji-Rong Wen, Beijing (CN); Wei-Ying Ma, Beijing (CN); Yi-Min Wang, Redmond, WA (US); Zheng Zhang, Beijing (CN)

(73) Assignee: Microsoft Corpoartion, Redmond, WA (US)

( * ) Notice: Subject to any disclaimer, the term of this patent is extended or adjusted under 35 U.S.C. 154(b) by 0 days.

(21) Appl. No.: 11/157,712

(22) Filed: Jun. 21, 2005

(65) Prior Publication Data

US 2006/0288261 A1 Dec. 21, 2006

(51) Int. Cl.
*G01R 31/00* (2006.01)

(52) U.S. Cl. .................... 702/185; 73/865.9; 340/500; 702/183; 702/187

(58) Field of Classification Search .............. 73/865.9; 324/500; 340/500, 635, 3.1, 3.43; 382/100, 382/155, 159; 700/90, 108; 702/33, 34, 702/35, 127, 182, 183, 184, 185, 186, 187

See application file for complete search history.

(56) References Cited

U.S. PATENT DOCUMENTS

| | | | | |
|---|---|---|---|---|
| 2,883,255 A | * | 4/1959 | Anderson | 346/34 |
| 3,521,235 A | * | 7/1970 | Becker | 382/155 |
| 4,192,451 A | * | 3/1980 | Swerling et al. | 714/732 |
| 5,001,714 A | * | 3/1991 | Stark et al. | 714/737 |
| 5,351,247 A | * | 9/1994 | Dow et al. | 714/26 |
| 5,652,754 A | * | 7/1997 | Pizzica | 714/732 |
| 6,167,358 A | * | 12/2000 | Othmer et al. | 702/188 |
| 6,643,592 B1 | * | 11/2003 | Loman et al. | 702/35 |
| 2004/0199828 A1 | * | 10/2004 | Cabezas et al. | 714/39 |

FOREIGN PATENT DOCUMENTS

| EP | 0292914 A1 | * | 11/1988 |
|---|---|---|---|
| EP | 0292914 B1 | * | 8/1993 |
| JP | 02-105947 A | * | 4/1990 |
| JP | 2001-22431 A | * | 1/2001 |

* cited by examiner

*Primary Examiner*—Edward Cosimano
(74) *Attorney, Agent, or Firm*—Lee & Hayes, PLLC

(57) ABSTRACT

System events preceding occurrence of a problem are likely to be similar to events preceding occurrence of the same problem at other times or on other systems. Thus, the cause of a problem may be identified by comparing a trace of events preceding occurrence of the problem with previously diagnosed traces. Traces of events preceding occurrences of a problem arising from a known cause are reduced to a series of descriptive elements. These elements are aligned to correlate differently timed but otherwise similar traces of events, converted into symbolic representations, and archived. A trace of events leading to an undiagnosed a problem similarly is converted to a symbolic representation. The representation of the undiagnosed trace is then compared to the archived representations to identify a similar archived representation. The cause of the similar archived representation is presented as a diagnosis of the problem.

15 Claims, 9 Drawing Sheets

502 abcdefghij
504 abcefhj
506 bcdfghij

*FIG. 5A*

502 abcdefghij
514 abc ef h j
516 bcd fghij

EVENT-BASED AUTOMATED DIAGNOSIS OF KNOWN PROBLEMS

BACKGROUND

Personal computers have become so affordable that they are commonplace in homes and businesses. In addition, with the development of increasingly more intuitive ways to interact with computers, such as speech and handwriting recognition systems, even people uncomfortable using keyboards now can use a computer. As a result, computers are being used by more and more people, some of whom have fewer and fewer technical skills.

Computer systems also have become increasingly more complex. From a hardware standpoint, computers may use a wide range of storage media, multimedia input/output devices, wired and wireless network interfaces, and many other accessories. From a software perspective, expansive operating systems are used to manage processes needed to control the hardware devices, as well as to support numerous applications that might be running at the same time. As a result, diagnosing problems occurring in such systems has become at least as complex as the computer systems themselves.

FIG. 1A presents a flow diagram illustrating the logical steps followed in a conventional diagnostic process. The process may be conducted with the user following a manual, speaking via telephone with computer support personnel, or by engaging a troubleshooting program that steps the user through a diagnostic process.

Flow diagram 100 begins at block 102. At block 104, the user engages the computing system and continues to do so until, at decision block 106, a problem is encountered. If a problem has not been encountered, the flow diagram 100 takes a No branch back to after the start 102 of the flow diagram and before the user interacts with the computing system in block 104. Once the user determines a problem has occurred, at block 108, the user attempts to develop a verbal description of the problem. Unfortunately, accurately describing the problem is a nontrivial step.

For example, the problem might be that the user has opened a web browser with the intention of using a web-based e-mail service. The browser may start successfully, but may present the message "page not found." An unsophisticated user may describe this problem, for example, by stating "my browser is not working," "the network is down," or "my e-mail is not available." However, the browser may be working correctly, the network may not be down, and the user's e-mail may indeed be available. The problem actually may result from a number of causes, including a hardware failure, a network interface driver not being properly installed, a network cable becoming unplugged, or many other causes not covered by the user's description. Similarly, if a user is unable to get the computer system to read a disk, or print a document, despite what the user might think, the problem may not have anything to do with the disk or the printer.

Unfortunately, being able to describe the problem is important for any conventional diagnostic process. For example, if the user is using a manual, the user must develop some specific description of the problem to determine where in the index of the manual to search for a solution. Similarly, a user must be able to describe the problem to a computer support technician for the technician to be able to provide any assistance. Even using an automated trouble-shooting system, the user must be able to at least recognize or distinguish among verbal descriptions of possible problems to successfully engage the trouble-shooter. Thus, requiring a user to describe a problem may present a problem in itself.

Assuming a description of the problem has been successfully developed at block 108, an attempt is made at block 110 to identify the cause of the problem. This process also may be difficult. Again, taking the example of the "page not found" problem, based on even a reasonable description of the problem, there may be a number of possible causes that the user may have to try to solve the problem. When the description offered at block 108 is less refined or accurate, the more difficult it will be at block 110 to identify the cause of the problem.

At decision block 112, it is determined if one or more causes have been identified. If so, at block 114, the identified cause or causes are communicated to the user, and the process ends at step 116. If it is determined at decision block 112 that the cause has not identified, the process also ends at step 116, leaving the user without a solution.

To avoid depending on the user to accurately describe a problem, attempts have been made to automate the diagnostic process. One such approach has attempted to automate the process by identifying abnormal computer system events. In principle, once a tell-tale abnormal event is identified, the abnormal event indicates the cause of the problem.

FIG. 1B presents a flow diagram 120 illustrating the logical steps followed in a state-based problem solving process. Flow diagram 120 begins at block 122. At block 124, the user interacts with the computing system until, at decision block 126, a problem is encountered. If a problem has not been encountered, the flow diagram 120 takes a No branch back to after the start 122 of the flow diagram and before the user interacts with the computing system in block 124. Once a problem has occurred, at block 128, an abnormal state-identifying diagnostic routine is intiated. At a decision block 130, it is determined if a catalogued abnormal state has been identified. If not, the process ends at block 136. However, if such an abnormal state is identified at decision block 130, at block 132, one or more causes associated with the abnormal state are retrieved. At block 134, the one or more causes associated with the catalogued abnormal state are communicated to the user, and flow diagram 120 ends at block 136.

Unfortunately, state-based diagnostic methods have several shortcomings. First, accurately isolating single, abnormal events that indicate the cause of a problem may not be possible. Complex computer systems process many events that may be normal in one context but not another. Second, continually logging events for the occurrence of an abnormal state generates a significant quantity of data. Continually logging events may prove impractical. State logging could be initiated by a user who has experienced a problem in hopes that the user can recreate the problem, but the abnormal state may not recur. Third, an abnormal state may be empirically associated with numerous causes of numerous problems. Communicating to a user that he should attempt many corrective actions, most or all of which may prove useless, would not be satisfactory to most users.

SUMMARY

Described herein are techniques for automating computer diagnoses. In order to identify the cause of a problem, an automated system compares a trace of events preceding occurrence of the problem with previously diagnosed traces.

Traces of events preceding occurrences of a problem arising from a known cause are reduced to a series of descriptive elements. These elements are aligned to correlate with differently timed but otherwise similar traces of events, converted into symbolic representations, and archived. A trace of events leading to an undiagnosed a problem similarly is converted to a symbolic representation. The representation of the undiagnosed trace is then compared to the archived representations to identify a similar archived representation. The cause of the similar archived representation is presented as a diagnosis of the problem.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

FIGS. 5A through 5C represent alignment and vectorization of a number of traced set of events.

DETAILED DESCRIPTION

Event-Based Diagnosis in Operation

Figure 1A:
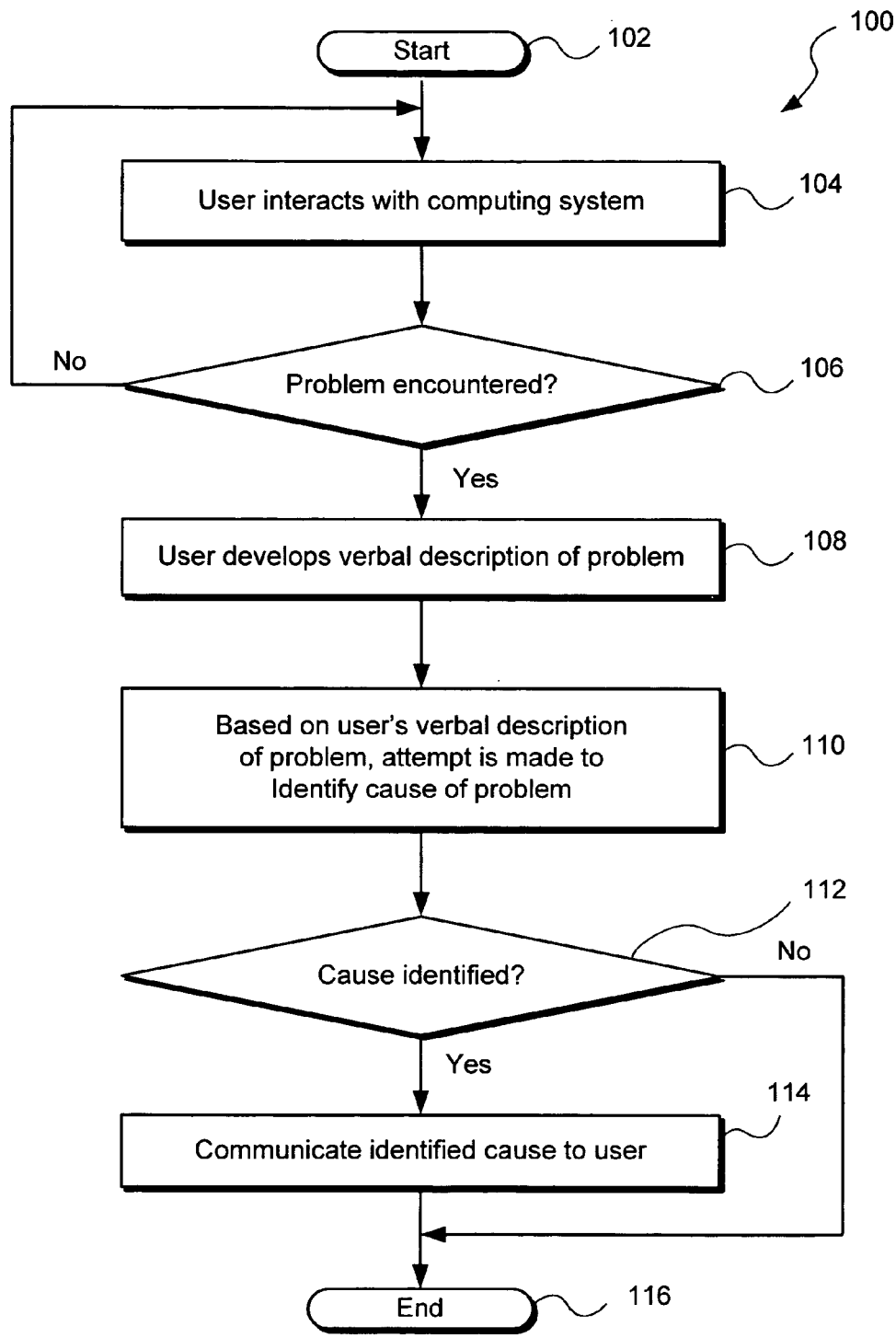
FIGS. 1A and 1B (Prior Art) are flow diagrams illustrating conventional diagnostic processes relying on user descriptions of the problem or attempting to identify individual events indicative of the cause the problem.
Figure 1B:
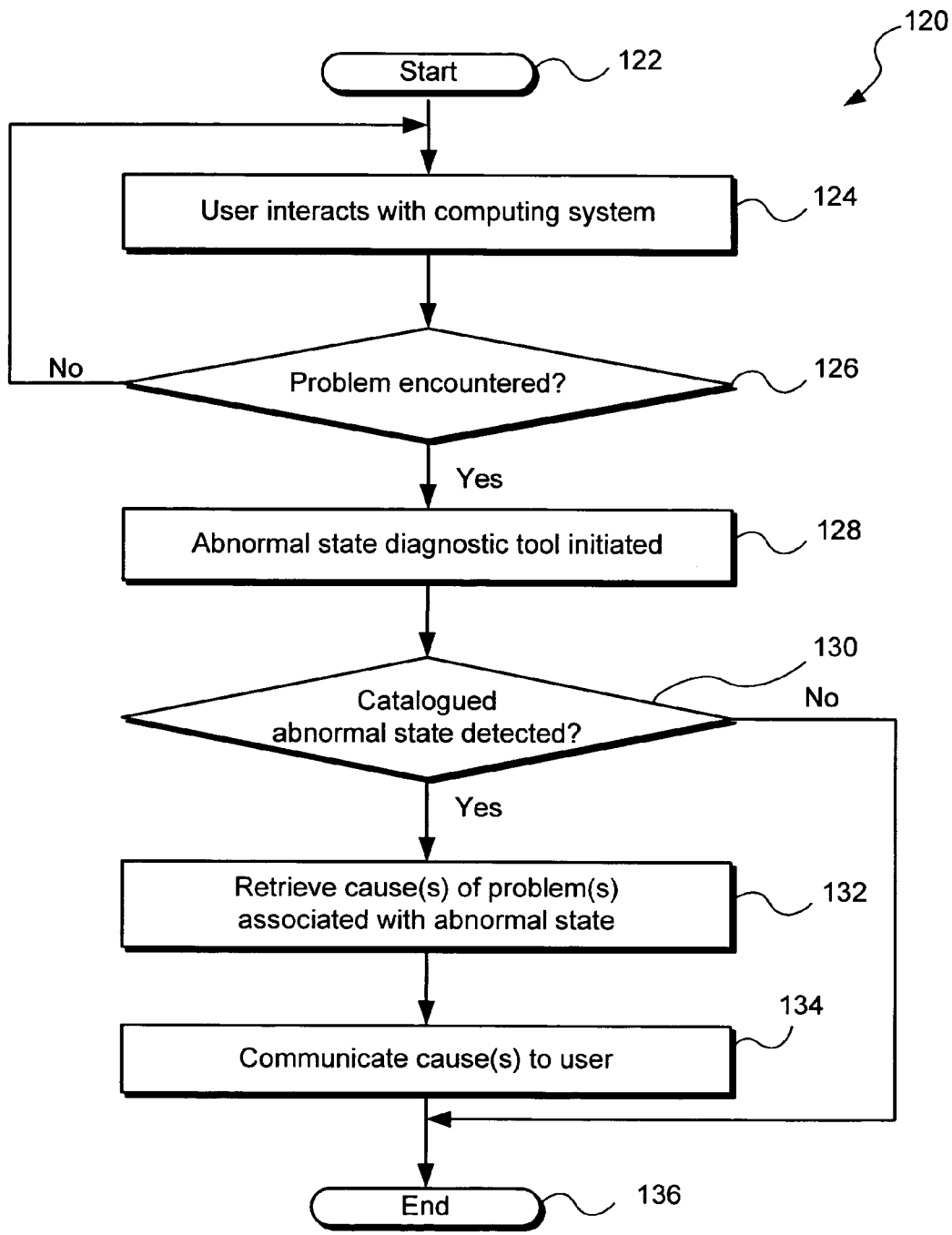
Figure 2:
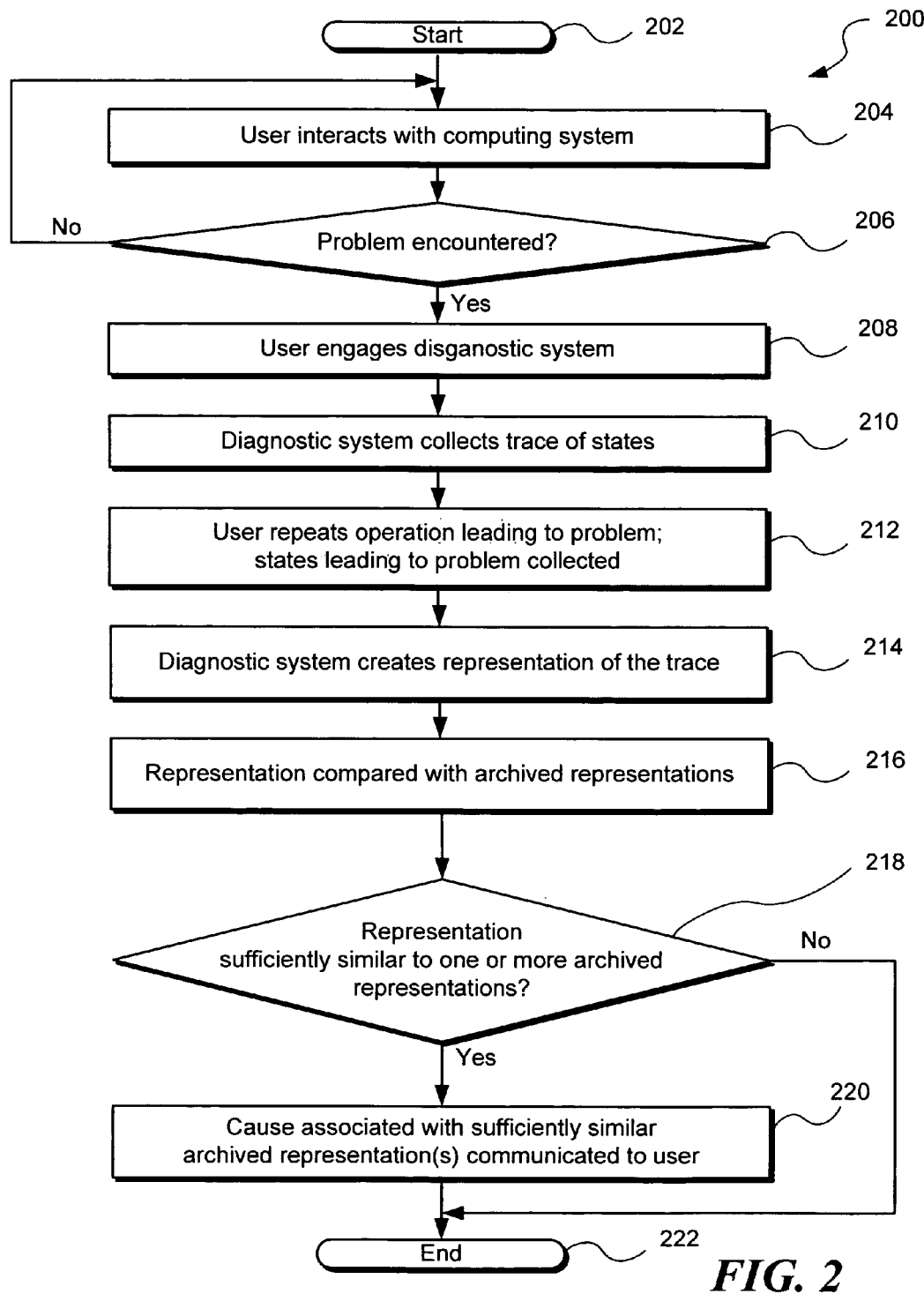
FIG. 2 is a flow diagram illustrating an embodiment of a diagnostic process that compares a trace of events leading to an undiagnosed problem with an archive of diagnosed traces of events.

Flow diagram 200 of FIG. 2 illustrates an exemplary mode of a process for determining the cause of a computer system problem. In contrast to conventional diagnostic processes illustrated in FIGS. 1A and 1B, the success of the process depends neither on the user being able to suitably describe the problem (FIG. 1A) nor on the possibility of identifying a single abnormal state that determinatively identifies the cause of the problem (FIG. 1B).

Instead, the process takes advantage of the realization that computer systems conducting similar sets of tasks typically engage in similar operations in preparation for that task. Thus, when diagnosing the occurrence of a problem in a computing system, system events preceding occurrence of a problem are likely to be similar to events preceding occurrence of the same problem on another computer system or at another time.

Flow diagram 200 begins at block 202. At block 204, the user interacts with the computing system and continues to do so until, at decision block 206, it is determined that a problem has been encountered. If a problem has not been encountered, the flow diagram 200 takes a No branch back to after the start 202 of the flow diagram and before the user interacts with the computing system in block 204. At block 208, the user engages an embodiment of a diagnostic system to identify a cause of the problem. At block 210, the diagnostic system collects a trace of events of the computing system while, at block 212, the user again attempts to recreate the problem by performing the actions from which the problem first arose. Thus, if the problem does reoccur, a trace of the events leading to the occurrence of the problem is collected. Alternatively, although not shown in FIG. 2, if the problem does not reoccur, the trouble shooting system becomes, at least temporarily, moot.

User initiation of a diagnostic trace at block 208 and then attempting to recreate the problem represents only one embodiment. Tracing of events could be performed continuously. As a result, when a problem occurs, trace data already would be available to facilitate diagnosis of the problem. Continuously tracing computing system events potentially results in very large collections of data having to be stored, considering the many thousands of events that may be traced in only a few seconds' time. Having a user initiate a trace of events at block 208 avoids using processing and storage resources to continually maintain such traces. As a further alternative, traces may be continually collected, but a storage cache where the trace data are stored may be purged automatically at predetermined intervals. The intervals may be set empirically to collect a sufficient number of events to support diagnosis of most if not all causes of problems, while being short enough to avoid consuming an excessive amount of resources.

In addition, continual tracing of events could be selectively initiated by a user. Thus, for example, if a user was experiencing an unusual number of problems, or was having difficulty recreating the occurrence of a problem after initiating a trace, the user may choose to enable continuous tracing for at least some period of time. The user could deactivate continuous tracing after the rash of problems seems to have been resolved. Further alternatively, a computing system could be configured to automatically respond to a plurality of error messages by initiating a trace of events, and request that the user repeat the operation that led to the occurrence of the problem.

At block 214, the diagnostic system creates a representation of the trace of events. Creating the representation, as will be described further below, may include sorting, formatting, aligning, and vectorizing the events. At block 216, the resulting representation is compared with a plurality of archived representations. The archived representations have been created from series of events that have been identified with known causes of various problems.

The archived representations are collected from traces of events where causes of problems were deliberately interposed to determine what events would be processed when the cause was present. Additional traces may have been collected in situations where the cause was later diagnosed, even if the problem was not deliberately interposed. Traces represented may also include those for which the cause was diagnosed by a diagnostic system according to an embodiment of the diagnostic process, and then added to the archived representations to make the archive of representations more robust. The archived representations will have been created using a similar process of sorting, formatting, aligning, and vectorizing. The archived representations constitute a knowledge base for the automated evaluation of future, undiagnosed traces.

At decision block 218, it is determined if the currently collected trace is similar to one or more archived representations. If so, at block 220, the cause or causes associated with each of the archived representations to which the current trace is sufficiently are communicated to the user. The process ends at block 222.

Alternatively, if the representation of the trace being diagnosed is not sufficiently similar to any of the archived, the process ends at block 222 without a cause being identified. As the collection of previously archived representations identified with known causes becomes more robust, it will become less likely the process will end without identifying a likely cause.

Architecture of Exemplary Event-Based Diagnostic System

Figure 3:
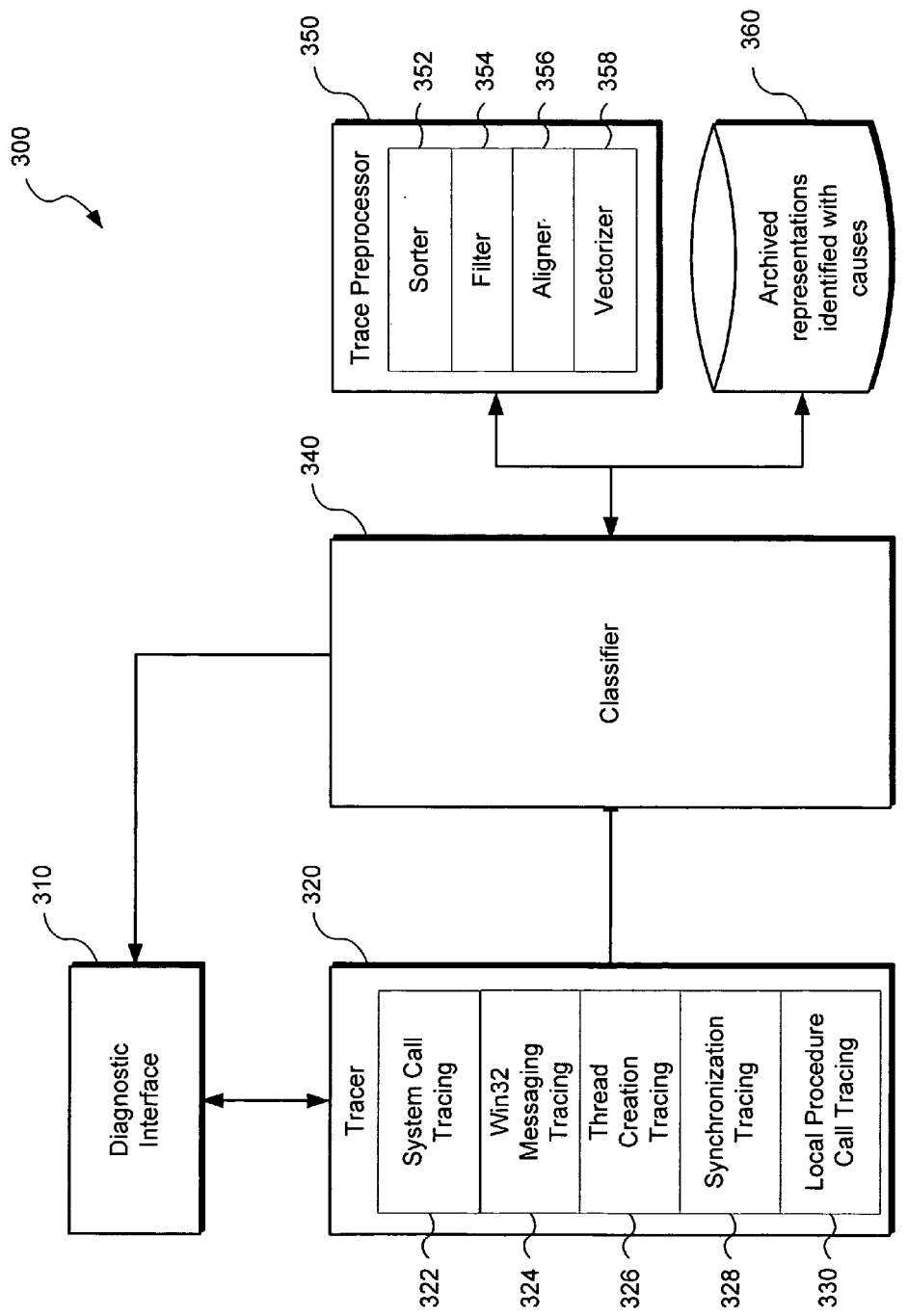
FIG. 3 is a functional block diagram of an exemplary diagnostic system.

FIG. 3 illustrates a functional block diagram of an exemplary mode of a diagnostic system 300. An interface 310 allows a user to engage and control system 300 to control traces, receive identification of potential causes identified by diagnostic system 300, and otherwise manage the diagnostic system. Diagnostic interface 310 interacts with tracer 320, which collects traces of computing system events.

Tracer 320 potentially includes subsystems for tracing a number of different types of events. Thus, in the exemplary embodiment illustrated in FIG. 3, tracer 320 includes a system call tracing subsystem 322, a Win32 messaging tracing subsystem 324, a thread creation tracing subsystem 326, a synchronization tracing subsystem 328, and a local procedure call tracing subsystem 330. Alternative embodiments may include additional or fewer subsystems.

In the example of a Microsoft Windows® operating environment, a system call hooking technique traces the events by intercepting system calls. The logging of intercepted events is done through WPP Software Tracing. As is explained further below, process and/or thread beginning and end events are also logged along with system calls to facilitate sorting of the system calls.

Figure 4:
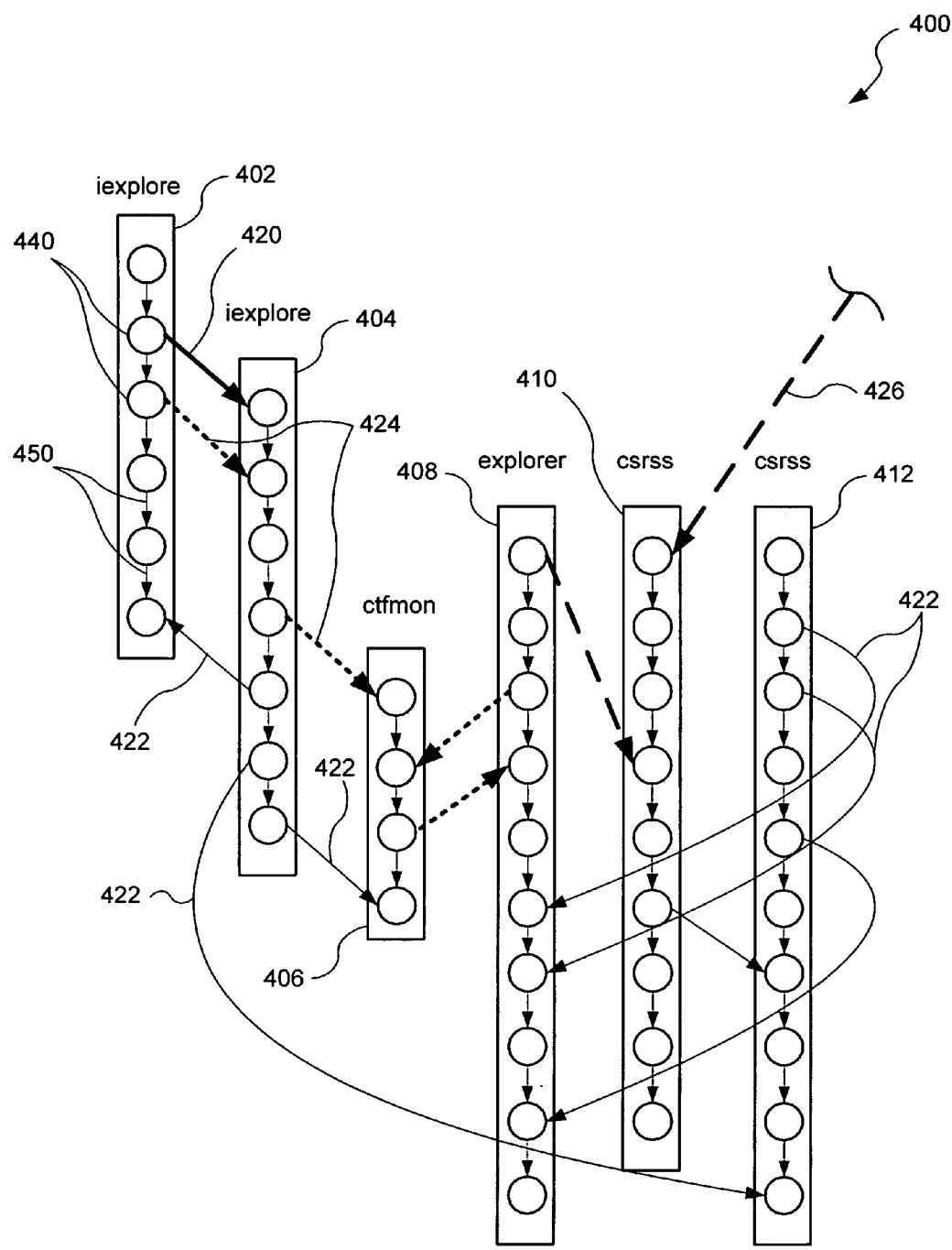
FIG. 4 is a causality diagram of multiple related threads executing on a computer system.

To illustrate events recorded by the tracer 320, FIG. 4 illustrates an exemplary causality diagram 400 showing creation and interaction of a number of threads in a Microsoft Windows® operating environment. It should be noted that, although exemplary modes included in this detailed description refer to a Microsoft Windows® operating environment, embodiments are not limited to Microsoft Windows® environments. Moreover, although causality diagram 400 illustrates multiple threads relating to operation of Microsoft Internet Explorer®, embodiments of the diagnostic system are usable with any number of applications and system tools in Microsoft Windows® and other operating environments.

Causality diagram 400 shows a number of threads that may be created while Microsoft Internet Explorer®, whose application threads are designated with "iexplore," is used to access the World Wide Web. Thread 402 is a first iexplore thread initiated by a user. Based on a user action or an external input, thread 402 creates a second iexplore thread 404. Thread 404 initiates a ctfmon thread 406. Ctfmon is a Microsoft Windows® process that monitors active windows and provides text input service support for keyboard and other user input technologies.

Thread 408 is a Windows Explorer ("explorer") thread. Explorer thread 408 interacts with ctfmon thread 406, as well as with csrss threads 410 and 412. Csrss.exe is a principle executable for the Microsoft Client/Server Runtime Server Subsystem that manages most graphical commands generated by a Microsoft Windows® operating system.

A number of messages are exchanged between the various threads. System creation message 420 issued by iexplore thread 402 initiates iexplore thread 404. Win32 messages 422 and synchronization messages 424 exchange information between threads. A local procedure call thread 426 initiates a thread invoking a local process, such as csrss thread 410.

Predominantly, however, causality diagram 400 illustrates a number of system calls 440 executing within the various threads. System calls 440 receive an external input or are otherwise involved in causal relationships with other system calls 440 signified by links 450. In one embodiment, system calls 440 are the principal focus of the diagnostic system. System calls 440 represent invocation of core system services. Further, Win32 and other messages described in connection with the causality diagram 400 may occur relatively infrequently as compared to the system calls. In addition, known techniques and tools exist for collecting system calls on various other operating platforms. Thus, focusing on system calls provides a workable foundation for diagnostic systems operable in many existing operating environments.

In one embodiment of the tracer 320 (FIG. 3), for each system call the tracer records a number of specific attributes, including a sequence number, a process id, a thread id, a process name, a thread name, a system call name, system call parameters, and a system call return value. Sequence numbers denote the order of event occurrences. Because system calls are logged upon exit, nested calls within a thread may appear in a sequence of traced system calls before the caller is listed. However, because the nested calls appear before the caller within the same thread, the relative order is still fairly representative of the process being traced.

The process id and thread id are used to distinguish system calls from different tasks. The process name is the image name of the process making the system call. The start address of the thread is used to resolve the thread name. The module containing the thread start address is determined, and the module name plus the offset of the thread start address is used as the thread name. The process name and thread name are used to sort the system calls, as is further described below.

System call parameters provide additional information about a system call. Where possible, system call parameters are transposed into a session-independent format to allow the system call parameters to be meaningfully compared with other, substantively similarly system call parameters. For example, kernel objects may be individually named and many system calls access kernel objects through these handles. However, logging a system call parameter referring to a kernel object according to the object name queried rather than by an individually named kernel object allows the system call parameters to be logged in a session-independent form.

Referring back to FIG. 3, traces collected by tracer 320 are passed to classifier 340. According to one exemplary embodiment of the system 300, classifier 340 engages a trace preprocessor 350 including a sorter 352, a filter 354, an aligner 356, and a vectorizer 358.

The sorter 352 is used to separate an undifferentiated series of events into coherent sequences of events. Referring to causality diagram 400 of FIG. 4, multiple threads may execute in parallel on a computing system. The number of threads executing will be a function of how many applications and processes are being executed, and the order of execution of the system calls may depend on prioritization of resources, external inputs, interrupts generated, and countless other variables. System calls 440 from simultaneously executing threads are interleaved for processing. A trace of system calls 440 will general a sequential list of system calls 440 regardless of the thread generating the system calls. The sorter 352 uses the thread id to correlate each of the system calls with the threads that generated them.

Filter 354 both removes events that are not deemed useful for diagnostic purposes, and also removes extraneous information from the sorted trace. According to one embodiment of a diagnostic system focusing on system calls, it is assumed that manifestations of a problem will appear when the system receives some input and starts to process it. Thus, according to one embodiment, system calls that are not relevant to an external input are eliminated by the filter.

According to an exemplary embodiment, three rules may be used to discard particular system calls. First, if a system call receives an external input, the system call is considered relevant to the input. For example, a Windows® application receives hardware input through GetMessage or PeekMessage system calls. Thus, GetMessage and PeekMessage system calls are considered relevant. Second, if a system call is causally related to another system call that is relevant to an external input, then the system call is considered to also be relevant to the input. Third, if a system call follows another system call that is relevant to an external input, the system call also is considered relevant.

For example, referring to the causality diagram 400 of FIG. 4, iexplore thread 402 obtains an input with its first system call. Thus, according to the first and third rules described in the previous paragraph, all system calls in that thread are relevant to the input. Iexplore thread 404 is created by iexplore thread 402. Thus, according to the second rule, the first system call of iexplore thread 404 is relevant to the input that the first thread received. Thus, the other system calls in iexplore thread 404 also are considered relevant according to the third rule. Similarly, ctfmon thread 406 is invoked by iexplore thread 404, thus, the first system call of ctfmon thread 406 is also considered relevant to that input. The second system call of ctfmon thread 406 is responsive to explorer thread 408, which has received another input. Thus, the second system call of ctfmon thread 406 is relevant to the input from explorer thread 408.

It should be noted that a system call is truly relevant to an external input if it is produced by a portion of the application's code that is actually responsible for processing the input. Whether this portion of the application's code actually is responsible for processing input can only be verified by the developer of the application. Thus, the rules stated above for determining relevance may incorrectly classify some system calls as relevant. For example, a thread of an application may need to synchronize with another thread before accessing a shared resource needed for processing an input. The purpose of the synchronization may not be known. Under the previously stated rules, for example, a thread of an application may always invoke particular system calls after processing an input, even though these particular system calls are not actually relevant to processing the input. Nonetheless, under the rules stated above, these system calls may be considered relevant to processing the input.

However, even if such system calls incorrectly are deemed relevant to input processing, if they reoccur in other invocations of the application, they may not negatively impact the diagnostic process. Irrelevant system calls may only further indicate similarly in a representation of a trace to an archived representation. The only disadvantage of including not truly relevant system calls may be that they consume storage space and processing time without representing relevant information.

Application relevance rules also may result in system calls being falsely classified as irrelevant. For example, an application may use its own method for thread communications instead of using standard ones. Nonetheless, such a system call may not be material to the occurrence of a problem. Furthermore, it is likely that other system calls involved in processing the input will be classified as relevant and, thus, included in the representation.

As previously stated, developers of applications can be consulted to identify system calls that are and are not relevant to input processing, and specific rules can be added to include and exclude such calls. Thus, the diagnostic system can be refined to more accurately include all system calls relevant to input processing while eliminating irrelevant system calls that potentially waste resources consumed by the diagnostic system.

In addition to removing extraneous system calls or other events, filter 354 also removes unnecessary information from events deemed relevant. For example, a unique thread generated at a particular time may be identified by a name including a unique path or registry path. Even substantively identical events may appear to be different from one another because of these unique path names. Although path names are useful for differentiating between threads executing in a computing system, such information only serves to make identical events appear to be different, and thus hampers operation of embodiments of the diagnostic system. Filter 354 removes path names that differentiate otherwise similar events.

The aligner 356 normalizes sequencing of events in traces to identify similarities in execution of events, even if the events do not occur in each trace at the same time. FIG. 5A shows three sequences of letters 502, 504, and 506, representing three series of events preceding occurrence of the problem as a result of the same cause. Substantively similar events are represented by the same letters. Thus, letter b in sequence 502 represents the same substantive events represented by letter b in sequences 504 and 506.

Literally comparing sequences 502, 504, and 506, the sequences do not match. Sequences 502 and 504 begin with the same three letters, but then appear to diverge. Sequence 506 does not begin with the save event, and thus may be overlooked.

Aligner 356 (FIG. 3) aligns similar events within the sequences to aid in identifying similarities between them. FIG. 5B includes sequence 502 and aligned sequences 514, and 516 corresponding to sequences 504, and 506 (FIG. 5A), respectively. Sequence 502, which includes all possible sets of events, serves as a base sequence to which the sequences 504 and 506 are aligned. Base sequence 502 may include a recorded trace of events, or may be compiled from a number of sequences of events leading to occurrences of a problem.

Aligned sequences 514, and 516 are produced by comparing sequences 504 and 506 with base sequence 502, and inserting spaces between events where the sequences do not match. However, by inserting spaces where the sequences do not match, subsequent events in the sequences may match, revealing similarities that may otherwise have been overlooked.

Thus, by inserting spaces in sequence 504 where sequence 504 does not correspond with base sequence 502, aligned sequence 514 is generated. Aligned sequence 514 thus proves to be highly similar to base string 502, with aligned sequence 514 including seven of ten events executed in the same order. If the spaces had not been inserted, sequences 502 and 504 would have been considered entirely different after the third element. Similarly, by inserting spaces in sequence 506 where sequence 506 does not correspond with base sequence 502, greater similarities between sequences 502 and 506 are identified. Because sequences 502 and 506 include different first events, a coarse comparison of sequences 502 and 506 would conclude the sequences were entirely different. However, inserting spaces where events in sequence 506 do not align with sequence 502 generates aligned sequence 516 in which eight of ten events are the same.

Referring back to FIG. 3, vectorizer 358 replaces events in the aligned sequences with a for each event in another sequence that matches the base string and a 0 for each event in another sequence that does not match the base sequence. Thus, comparing aligned sequences 514 and 516 with base sequence 502 of FIG. 5B, vectors 522, 524, and 526 as shown in FIG. 5C, respectively, are generated. Because base sequence 502 matches itself, vector 522 includes all is. For aligned sequences 514 and 516, each of which is largely similar to base sequence 502, vectors 524 and 526, respectively, include mostly 1s.

FIG. 5C illustrates how vectors 524 and 526 are not identical to vector 522, and may not appear to be convincingly similar. However, considering that sequences of events collected in traces preceding occurrences of a problem may include thousands or tens of thousands of events, vectors including 70%, 80%, or more of the same events as compared to the base sequence represent a striking similarity to the vector being analyzed.

With the classifier 340 having used preprocessor 350 to prepare the trace, the classifier 340 now accesses archive 360 storing representations of series of events that previously have been identified with identified causes of known problems. As previously mentioned, classifier 340 compares a vector representation of the preprocessed trace with archived vector representations. Upon finding at least one archived vector representation that is sufficiently similar to the vector representation of the current trace of events, the classifier 340 retrieves the cause associated with the sufficiently similar archived vector representation. Ultimately, the classifier communicates the identified cause to diagnostic interface 310, and diagnostic interface 310 reports the identified cause to the user.

More specifically, in one embodiment of the diagnostic system, the classifier 340 uses a pattern recognition algorithm to identify sufficiently similar archived representations. Pattern recognition algorithms used in image or language classification are suitable for use by the classifier 340. In one embodiment, a Support Vector Machines (SVM) pattern classification algorithm is used because it has been shown to perform well on high dimensional data sets, such as the representations of traces of events. Such a pattern classification algorithm, as well as other suitable pattern classification algorithms known to those ordinarily skilled in the art of classification algorithms may be used. More particularly, in one embodiment of the diagnostic system, archived representations are used to build a prediction model in LibSVM® which is stored as a persistent file. Preferably, the linear SVM kernel is used because it is more robust than the nonlinear kernel. The persistent file is loaded by the classifier 340 and used to classify representations of traces of events for diagnosis.

Portions of system 300 may be stored locally on a system where diagnosis may be desired, or may be stored on a system accessible via a network. For example, diagnostic interface 310 and tracer 320 may be locally stored on a machine for which diagnosis may be desired. A trace of events collected may then be submitted to a classifier 340, preprocessor 350, and archive 360 located on a system accessible via a network for diagnosis of the trace. Alternatively, most elements of system 300 may be stored locally while archive 360 is stored on a remote system. The size of archive 360, coupled with a desire to expand the archive with new traces submitted for analysis, may make storage of archive 360 on a shared server desirable.

Development of Archived Representations

Figure 6:
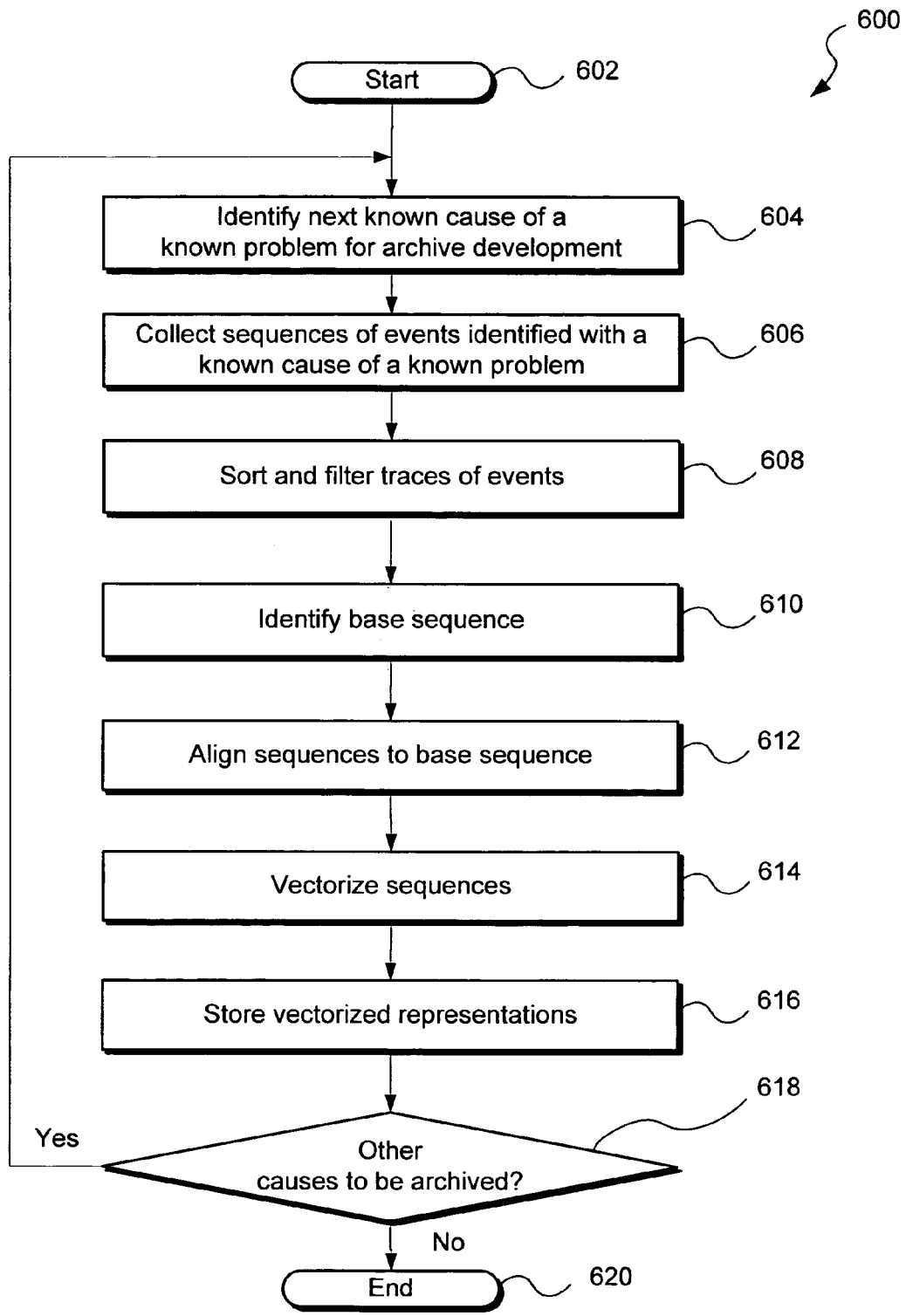
FIG. 6 is a flow diagram illustrating an exemplary mode of developing archived representations for previously diagnosed traces of events.

FIG. 6 is a flow diagram 600 of an exemplary mode for building a knowledge base of archived representations that can be used in determining causes of problems. Flow diagram 600 starts at block 602. At block 604, a known cause of a known problem is identified for development of archived representations signifying the identified cause. At block 606, sequences of events are collected from systems in which the known cause of the known problem is present. Sequences of events may be collected by repeatedly recreating the problem on one or more computer systems while collecting the events leading to the manifestation of the problem.

The known cause may be intentionally interposed to facilitate collection of the traces associated with the known cause. For example, the selected cause is improper installation of a driver for a network interface adapter, which results in the problem of Windows Internet Explorer® not being able to find a desired page—or any page—on the Internet. To interpose the known cause, the driver may be intentionally deleted. Then, repeated attempts to access the Internet with Internet Explorer are made with the events being traced.

Alternatively, sequences of events may be collected without the cause of the problem being deliberately created. For example, while events are being recorded, the problem may happen coincidentally. Assuming the problem is manually diagnosed, the sequence of events leading to the occurrence of the problem may be saved and included among the sequences of events used building the archived representations. Further alternatively, once a set of archived representations is being used for problem diagnosis, traces of events submitted for diagnosis and successfully diagnosed may also be added to the archived representations to make the archive more robust.

At block 608, traces of sequences of events are sorted and filtered as previously described in connection with the preprocessor 350 FIG. 3. At block 610, a base sequence of events is identified that is used to align other sequences. Base sequence may represent a compilation of all events included in any of the traces, a compilation of events occurring in a majority of the traces, or the base sequence may be selected according to other criteria.

At block 612, the traces are aligned with the base sequence as previously described in connection with FIGS. 5A and 5B. At block 614, the aligned traces are vectorized to signify the correspondence of the traces with the base sequence. At block 616, the vectorized traces are stored for use in later classification of undiagnosed traces.

At decision block 618, it is determined if there are other causes for which archived representations are to be created. If so, flow diagram 600 loops to block 604 to identify a next known cause for development of archived representations. If not, flow diagram ends at block 620.

After an initial set of archived representations has been developed and stored, the process described by flow diagram 600 may be adapted when adding further representations to the archive. For example, to add an additional representation signifying a trace of a problem resulting from a known cause, base sequence need not be identified at block 610.

Analysis of an Undiagnosed Trace

Figure 7:
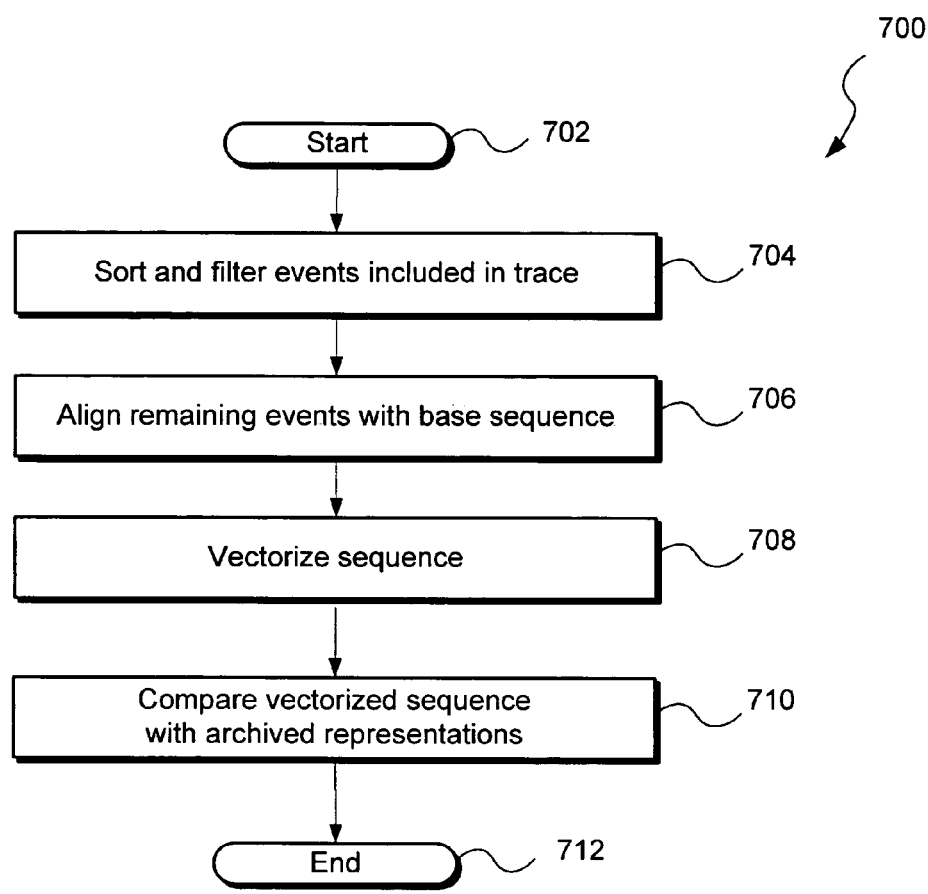
FIG. 7 is a flow diagram illustrating an exemplary mode of creating a representation for an undiagnosed trace of events.

FIG. 7 is a flow diagram 700 of an exemplary mode of analyzing an undiagnosed trace. Flow diagram 200 of FIG. 2 describes the process in which a user encounters a problem and invokes an embodiment of the diagnostic system, whereas flow diagram 700 details process of representing the undiagnosed trace at block 214 and comparing the undiagnosed trace with archived representations at block 216 of FIG. 2

Flow diagram 700 starts at block 702. At block 704, the trace of events leading to the undiagnosed problem is sorted and filtered as previously described in connection with FIG. 3. At block 706, the sorted, remaining events are aligned with the base sequence as described in connection with FIGS. 5A and 5B. At block 708, the aligned sequence is vectorized as described in connection with FIGS. 5B and 5C. At block 710, the vectorized sequence is compared with the archived representations. In one embodiment of the invention, this comparison is performed by comparing the vectorized sequence using LibSVM®. Flow diagram 700 ends at block 712.

COMPUTING SYSTEM FOR IMPLEMENTING AN EMBODIMENT OF THE INVENTION

Figure 8:
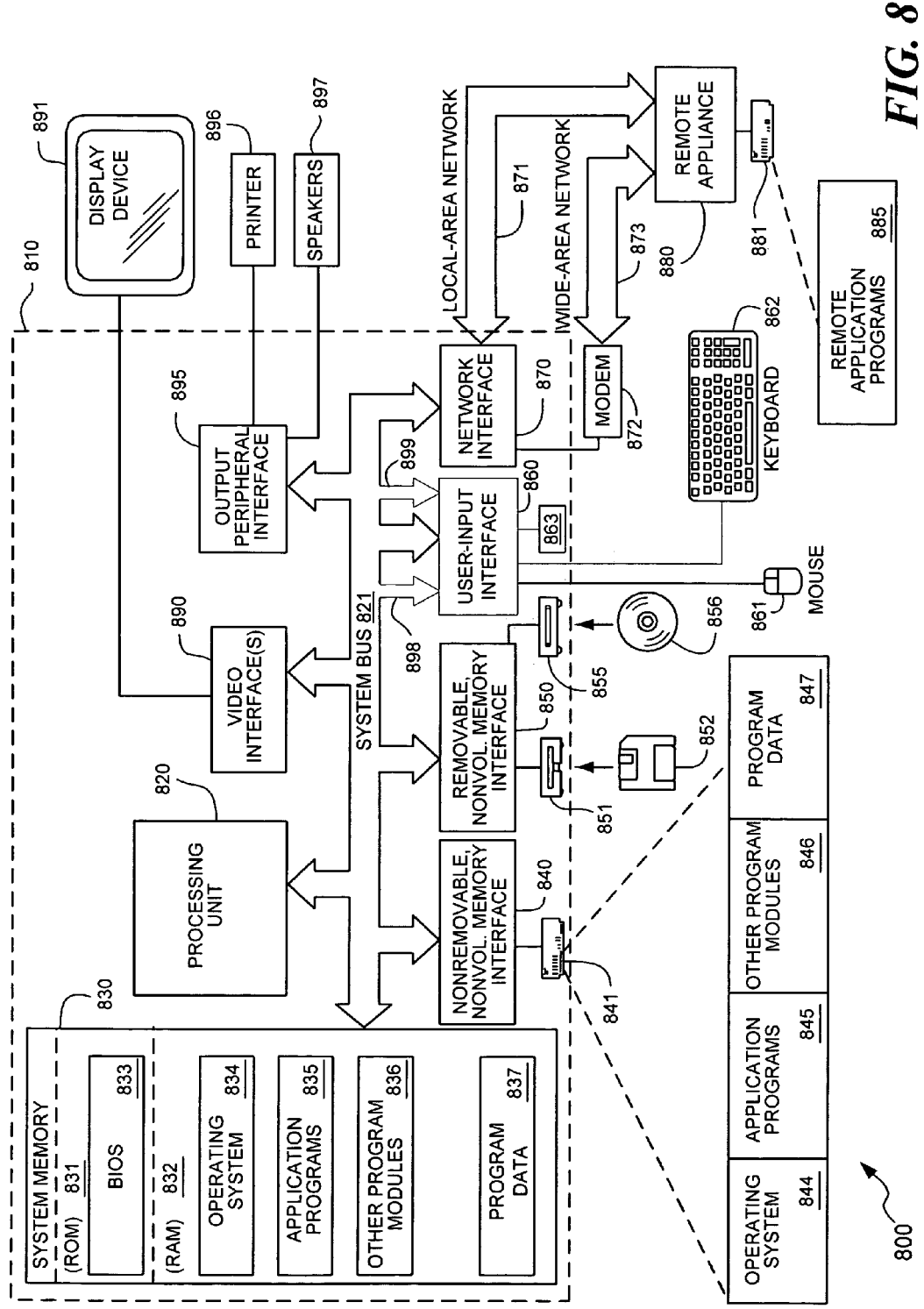
FIG. 8 is a block diagram of a computing-system environment suitable for use in equilibrating prices in an auction.

FIG. 8 illustrates an exemplary computing system 800 for creating and/or implementing the diagnostic system. The computing system 800 is only one example of a suitable operating environment for an embodiment of the present invention and is not intended to suggest any limitation as to the scope of use or functionality of the invention. Neither should the computing system 800 be interpreted as having any dependency or requirement relating to any one or combination of components illustrated in the exemplary operating environment 800. In addition, as previously described, portions of the system may reside on separate computing systems, and multiple computing systems may be used to create an archive to support the diagnostic system. Thus, multiple computing systems as described in FIG. 8 may be used in implementing embodiments of the diagnostic system.

Embodiments may be described in the general context of computer-executable instructions, such as program modules, being executed on computing system 800. Generally, program modules include routines, programs, objects, components, data structures, etc., that perform particular tasks or implement particular abstract data types. Moreover, those skilled in the art will appreciate that embodiments may be practiced with a variety of computer-system configurations, including hand-held devices, multiprocessor systems, microprocessor-based or programmable-consumer electronics, minicomputers, mainframe computers, and the like.

With reference to FIG. 8, an exemplary computing system 800 includes a computer 810 including a processing unit 820, a system memory 830, and a system bus 821 that couples various system components including the system memory 830 to the processing unit 820.

Computer 810 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 810. The system memory 830 includes computer-storage media in the form of volatile and/or nonvolatile memory such as ROM 831 and RAM 832. A Basic Input/Output System 833 (BIOS), containing the basic routines that help to transfer information between elements within computer 810 (such as during start-up) is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/nonremovable, volatile/nonvolatile computer-storage media. By way of example only, FIG. 8 illustrates a hard disk drive 841 that reads from or writes to nonremovable, nonvolatile magnetic media, a magnetic disk drive 851 that reads from or writes to a removable, nonvolatile magnetic disk 852, and an optical-disc drive 855 that reads from or writes to a removable, nonvolatile optical disc 856 such as a CD-ROM or other optical media. Other removable/non-removable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 841 is typically connected to the system bus 821 through a nonremovable memory interface such as interface 840. Magnetic disk drive 851 and optical dick drive 855 are typically connected to the system bus 821 by a removable memory interface, such as interface 850.

The drives and their associated computer-storage media discussed above and illustrated in FIG. 8 provide storage of computer-readable instructions, data structures, program modules and other data for computer 810. For example, hard disk drive 841 is illustrated as storing operating system 844, application programs 845, other program modules 846, and program data 847. Note that these components can either be the same as or different from operating system 834, application programs 835, other program modules 836, and program data 837. Typically, the operating system, application programs, and the like that are stored in RAM are portions of the corresponding systems, programs, or data read from hard disk drive 841, the portions varying in size and scope depending on the functions desired. Operating system 844, application programs 845, other program modules 846, and program data 847 are given different numbers here to illustrate that, at a minimum, they can be different copies. A user may enter commands and information into the computer 810 through input devices such as a keyboard 862; pointing device 861, commonly referred to as a mouse, trackball or touch pad; a wireless-input-reception component 863; or a wireless source such as a remote control. Other input devices (not shown) may include a microphone, joystick, game pad, satellite dish, scanner, or the like. These and other input devices are often connected to the processing unit 820 through a user-input interface 860 that is coupled to the system bus 821 but may be connected by other interface and bus structures, such as a parallel port, game port, IEEE 8394 port, or a universal serial bus (USB) 898, or infrared (IR) bus 899. As previously mentioned, input/output functions can be facilitated in a distributed manner via a communications network.

A display device 891 is also connected to the system bus 821 via an interface, such as a video interface 890. Display device 891 can be any device to display the output of computer 810 not limited to a monitor, an LCD screen, a TFT screen, a flat-panel display, a conventional television, or screen projector. In addition to the display device 891, computers may also include other peripheral output devices such as speakers 897 and printer 896, which may be connected through an output peripheral interface 895.

The computer 810 is configured to operate in a networked environment using logical connections to one or more remote computers, such as a remote computer 880. The remote computer 880 may be a personal computer, and typically includes many or all of the elements described above relative to the computer 810, although only a memory storage device 881 has been illustrated in FIG. 8. The logical connections depicted in FIG. 8 include a local-area network (LAN) 871 and a wide-area network (WAN) 873 but may also include other networks, such as connections to a metropolitan-area network (MAN), intranet, or the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the network interface 870, or other appropriate mechanism. Modem 872 could be a cable modem, DSL modem, or other broadband device. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary, and other means of establishing a communications link between the computers may be used.

Although many other internal components of the computer 810 are not shown, those of ordinary skill in the art will appreciate that such components and the interconnections are well-known. For example, including various expansion cards such as television-tuner cards and network-interface cards within a computer 810 is conventional. Accordingly, additional details concerning the internal construction of the computer 810 are widely understood.

When the computer 810 is turned on or reset, the BIOS 833, which is stored in ROM 831, instructs the processing unit 820 to load the operating system, or necessary portion thereof, from the hard disk drive 841 into the RAM 832. Once the copied portion of the operating system, designated as operating system 844, is loaded into RAM 832, the processing unit 820 executes the operating system code and causes the visual elements associated with the user interface of the operating system 834 to be displayed on the display device 891. Typically, when an application program 845 is opened by a user, the program code and relevant data are read from the hard disk drive 841 and the necessary portions are copied into RAM 832, the copied portion represented herein by reference numeral 835.

CONCLUSION

Although embodiments of a diagnostic method and system have been described in language specific to structural features and/or methodological acts, it is to be understood that the appended claims are not necessarily limited to the specific features or acts described. Rather, the specific features and acts are disclosed as exemplary forms of implementing embodiments of the diagnostic system and method.

The invention claimed is:

1. A method for determining a cause of a problem occurring during operation of a computer system, comprising:
    logging events processed by the computer system preceding the problem;
    creating a representation of at least a portion of the events logged;
    comparing the representation with a plurality of archived representations, each of the archived representations signifying a plurality of events associated with a known cause of a known problem;
    identifying the cause of the problem as the known cause associated with a similar archived representation found to be comparable to the representation for use for solving the identified problem; and
    wherein the creating of the representation includes sequentially aligning the events with occurrence of corresponding events included in a base sequence of events.

2. The method of claim 1, wherein the logging of events includes at least one of:
    continually logging events processed by the computer system;
    continually logging events processed by the computer system, purging events logged longer than a predetermined duration before a most recently logged event;
    logging events upon direction of a user; or
    logging events after occurrence of a catalogued problem while the user attempts to initiate another occurrence of the problem.

3. The method of claim 1, wherein the creating of the representation includes removing from data describing the event information specific to a particular iteration of the event that does not describe substance of the event.

4. The method of claim 1, wherein the method is implemented by using one or more processors to execute machine instructions stored in a computer readable media.

5. The method of claim 1 wherein the creating of the representation includes generating a vector representing instances of correspondence and lack of correspondence of the aligned events with the base sequence.

6. The method of claim 5, wherein identifying the cause of the encountered problem includes comparing the vector with a plurality of stored vectors, each of the stored vectors representing the plurality of stored representations.

7. The method of claim 1, wherein the logging of events includes logging system calls.

8. The method of claim 7, wherein the logging of events further includes logging at least one of:
    process beginning events;
    process ending events;
    thread beginning events; or
    thread ending events.

9. The method of claim 8, wherein the creating of the representation of the events logged includes ordering each of the system calls relative to one of a process and a thread invoking each of the system calls.

10. A method for developing an archive for diagnosing a cause of a problem, comprising:
identifying a plurality of causes for at least one known problem;
for each of the plurality of causes, creating a representation including:
logging events processed by a computer system preceding at least one occurrence of the known problem attributable to a known cause;
aligning the events with occurrence of corresponding events included in a base sequence of events;
generating a vector representing instances of correspondence and lack of correspondence of the aligned events with the base sequence; and
associating the vector with the known cause; and
collecting the vectors in the archive such that the archive is searchable according to correspondence of an input vector with the vectors associated with the known cause for use for diagnosing a problem.

11. The method of claim 10, wherein the events include system calls sorted according to one of a thread or a process invoking each of the system calls.

12. The method of claim 10, further comprising storing the archive on at least one of:
on a client computer system potentially using the archive for diagnosis of the problem occurring operation of the client computing system; or
on another computer system accessible by at least one client computer system potentially using the archive for diagnosis of the problem occurring operation of the client computing system.

13. The method of claim 10, wherein the logging of events preceding occurrences of the known problem includes at least one of:
deliberately interposing the known cause of the known problem and logging events while directing the computer system so that the problem will manifest;
collecting the events preceding an unintended occurrence of the problem once the known cause is discerned; or
collecting the events preceding an unintended occurrence of the problem where the known cause is diagnosed by comparison with the representations previously collected in the archive.

14. The method of claim 13, wherein the logging of events preceding interposition of the known cause includes at least one of:
deliberately interposing the known cause on a single computer system and repeatedly directing the computer system in a manner causing the problem to reoccur; or
deliberately interposing the known cause on a plurality of computer systems and directing the plurality of computer system so that the problem will manifest on each of the plurality of computer systems.

15. A computer-readable media comprising a tangible component of machine instructions that, when executed on one or more processors, perform the actions comprising:
developing an archive for diagnosing a cause of a problem;
identifying a plurality of causes for at least one known problem;
for each of the plurality of causes, creating a representation including:
logging events processed by a computer system preceding at least one occurrence of the known problem attributable to a known cause;
aligning the events with occurrence of corresponding events included in a base sequence of events;
generating a vector representing instances of correspondence and lack of correspondence of the aligned events with the base sequence; and
associating the vector with the known cause; and
collecting the vectors in the archive such that the archive is searchable according to correspondence of an input vector with the vectors associated with the known cause for use for diagnosing a problem.

* * * * *